(No Model.)
J. C. TESTMAN.
HAY STACKER.
No. 259,244. Patented June 6, 1882.
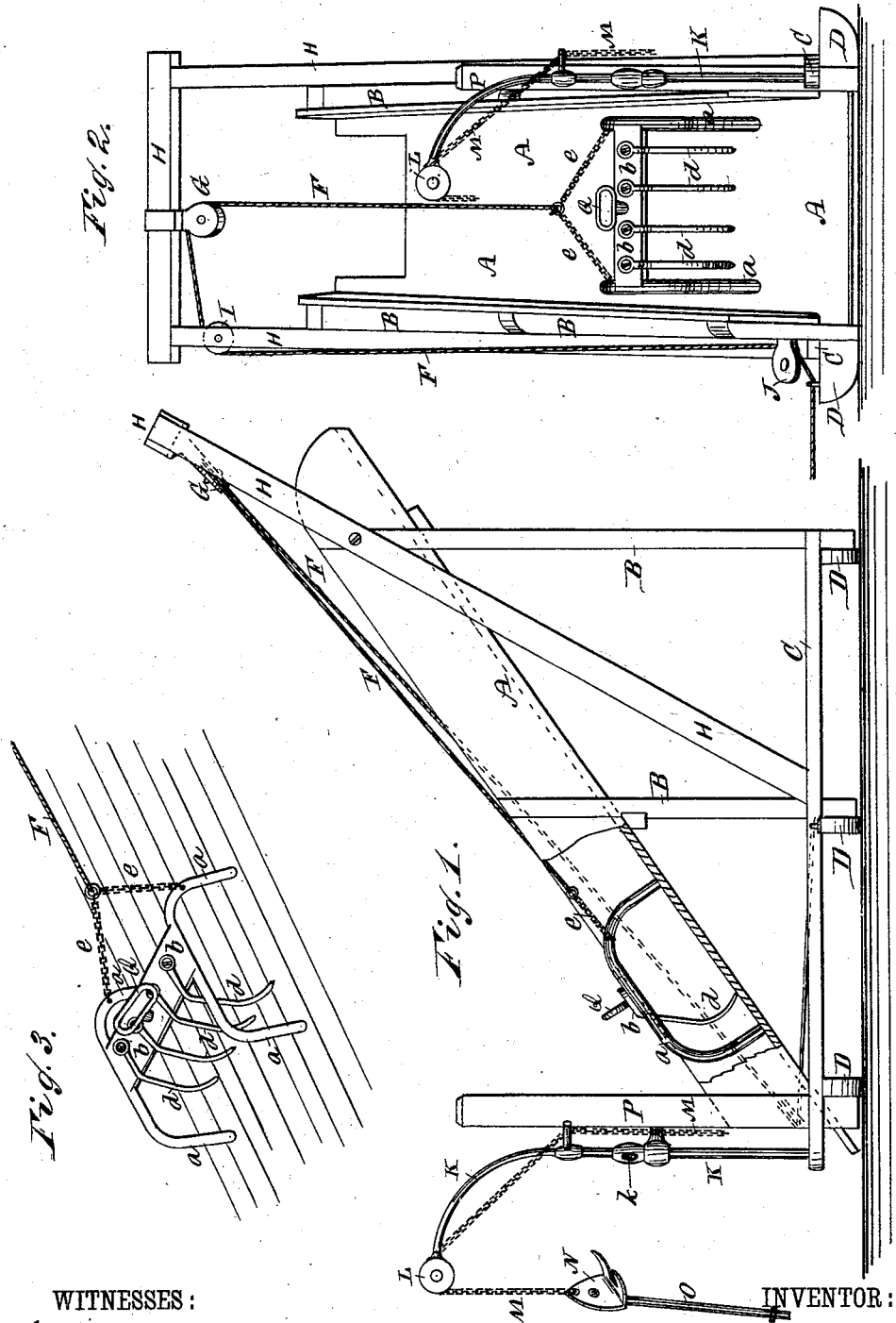
WITNESSES:
INVENTOR:
J. C. Testman
BY
ATTORNEYS.

UNITED STATES PATENT OFFICE.

JOHAN C. TESTMAN, OF WISNER, NEBRASKA.

HAY-STACKER.

SPECIFICATION forming part of Letters Patent No. 259,244, dated June 6, 1882.

Application filed March 22, 1882. (No model.)

To all whom it may concern:

Be it known that I, JOHAN C. TESTMAN, of Wisner, in the county of Cuming and State of Nebraska, have invented a new and Improved Hay-Stacker, of which the following is a full, clear, and exact description.

This invention consists of a portable frame with an ascending incline whereon a rake with rigging to haul it up with hay by horse-power and a derrick for lifting the rake above the hay by hand at the bottom of the incline are mounted and arranged, all as hereinafter described.

Reference is to be had to the accompanying drawings, forming part of this specification, in which similar letters of reference indicate corresponding parts in all the figures.

Figure 1 is a side elevation of my improved hay-stacker, with a part of the inclined way in section. Fig. 2 is a front elevation of it, and Fig. 3 is a perspective view of the rake.

A represents the inclined way up which the hay is to be hauled to the height of the stack. The way A is suitably supported on a frame of posts, B, sills C, and runners D. A rake is placed within the way A, to be hauled up from the ground to the height of the stack by a rope, F, running through a sheave, G, at the top of the frame H, which is somewhat higher than the top of the way A, thence through guide-sheaves I and J to the range of the horse employed to work the rake. The inclined way A is widened from the top downward to enable the rake to have a wider range laterally for gathering in the hay than it would have if only made the width required for the rake itself. The hoisting-frame H is also inclined in the same direction as the hoisting-way A, though not so much, to project the upper end forward over the stack, also for more substantial connection to the frame, and also for being in better position for resisting the thrust of the hoisting-rope. The hoisting-rope is extended from the hoisting-frame H to the sheave J at the base of the inclined way to apply the lifting force thereat low down upon the frame for greater stability of the machine, and for leaving the front of the machine free from the lifting-gear for the delivery of the hay to the stack all clear.

The rake consists of a strong frame of two rods, $a$, bent in the form of deep bows, and arranged with the ends to rest and ride on the inclined way, said bows being connected together parallel to each other, and nearly as wide apart as the width of the way A, by a strong bar or head, $b$, from which fingers $d$ extend downward along the lower ends of the bows, as shown, to hold the hay.

The bail Q is attached to the bar $b$ for hoisting the rake, and the rope F is attached, by chain $e$, to bars $a$ on the upper side of the rake, to draw it up the inclined way A.

The hay, being gathered to and about the foot of the way A, requires the rake to be lifted above it and carried to some distance away to take hold more effectually, and to be effective it must be too heavy to be so lifted by hand. I have therefore applied a derrick, consisting of crane K, sheave L, hoisting-chain M, and the hook N, with handle O, to the frame, and a strong post, P, at the foot of the way A, as shown, to engage the rake by the bail or handle Q thereon and swing it outward over the hay, when it is bunched around the foot of the way by the hay-sweep, or other means, and thus enable the rake to effectually engage the hay. The rope F is then drawn upon to haul the loaded rake up the inclined way A, over and past its upper end, to discharge the hay upon the stack, the entire operation being quickly, conveniently, and easily performed. The hook N, attached to the derrick-chain M for hoisting the rake, is provided with the handle O, which is pivoted to it, for a convenient means of reaching over the hay to the hook for controlling the rake, the pivoted connection of the handle facilitating the operations.

The crane is attached to the frame of the loader or stacker as a convenient means of its support and to be moved with it.

Aperture $k$ in derrick K is for temporary support of the free end of handle O.

Having thus fully described my invention, I claim as new and desire to secure by Letters Patent—

1. The combination, with a rake, of the inclined way A, widening downwardly from the top, and the mechanism F G H I J, connected with the rake by a chain, e, as and for the purpose described.

2. The combination, with the way A and rake having bail Q, of the post P, crane K, chain M, and hook N, having handle O, as and for the purpose specified.

3. The rake constructed, substantially as herein shown and described, with bow-shaped rods a, having feet resting on the widened way and connected by a back or head, b, with fingers d attached, substantially as specified.

JOHAN C. TESTMAN.

Witnesses:
J. C. KRINGEL,
SYLVESTER EMLEY.